May 24, 1932.  I. W. CEDERBERG  1,859,863
PREPARATION OF CONCENTRATED NITRIC ACID BY THE CATALYTIC COMBUSTION
OF AMMONIA WITH OXYGEN OR GASES RICH IN OXYGEN
Filed Feb. 15, 1929
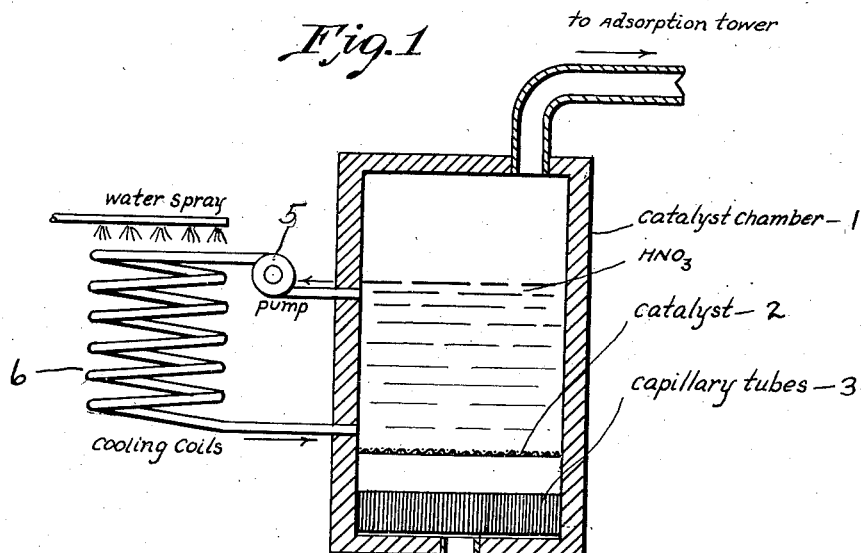
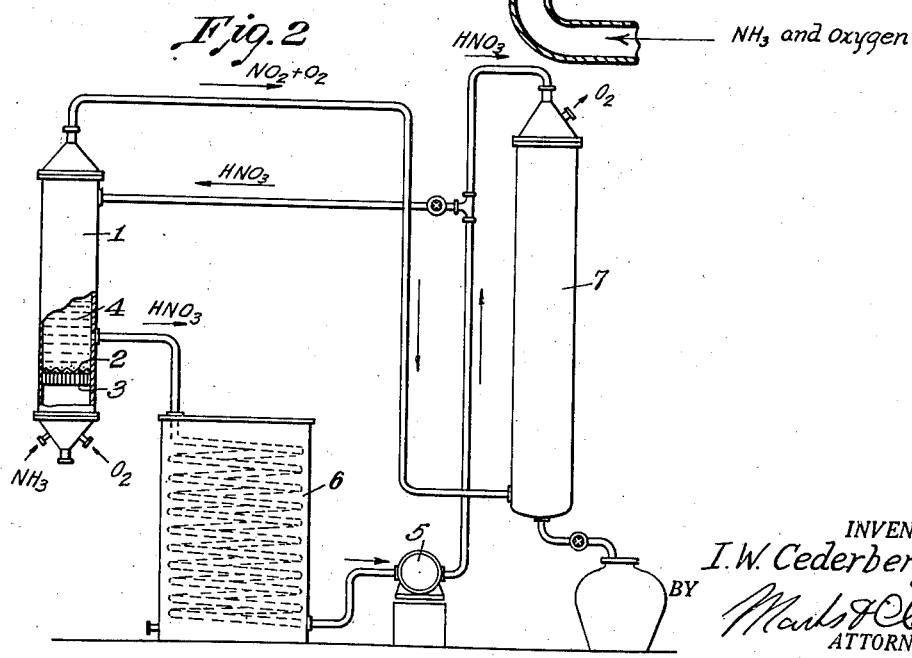
INVENTOR.
I. W. Cederberg
BY
ATTORNEYS.

Patented May 24, 1932

1,859,863

UNITED STATES PATENT OFFICE

IVAR WALFRID CEDERBERG, OF DAHLEM, NEAR BERLIN, GERMANY, ASSIGNOR TO OXYAMMON AKTIENGESELLSCHAFT, OF ZURICH, SWITZERLAND

PREPARATION OF CONCENTRATED NITRIC ACID BY THE CATALYTIC COMBUSTION OF AMMONIA WITH OXYGEN OR GASES RICH IN OXYGEN

Application filed February 15, 1929, Serial No. 340,122, and in Germany February 15, 1928.

It is known that the catalytic combustion of ammonia with oxygen or gases rich in oxygen renders possible the production of concentrated nitric acid without a separate concentration process. Great difficulties are involved, however, in carrying out this process industrially, since the temperature of the catalyst increases inadmissibly with an ammonia-content of the gas mixture exceeding 10% by volume, and moreover the lower explosion limit of ammonia-oxygen mixtures is already reached at ordinary pressure with a concentration of 16% by volume of ammonia.

It has now been found that these difficulties may be removed if the catalytic combustion of the ammonia-oxygen mixture is allowed to take place in a contact zone, which in relation to the direction of flow of the gases is situated before or beneath a layer of cooling liquid, through which stream the gases formed in the reaction directly after their exit from the contact zone. Nitric acid preferably serves as a cooling liquid, or water, which is converted in the course of the process into nitric acid by the absorption of the nitrogen oxides formed by the combustion.

A suitable form of apparatus for carrying out the process is shown in the accompanying drawings, in which:

Fig. 1 is a sectional view of the catalytic chamber.

Fig. 2 is a diagrammatic layout of the whole system.

The apparatus consists of a cylindrical reaction chamber 1 of acid resisting chrome-nickel steel, in which a contact zone is arranged, e. g. in the form of one or several platinum gauzes 2 occupying the cross-section of the chamber. The ammonia-oxygen mixture moves through this chamber from the bottom to the top. In order to prevent the risk of explosion the gas mixture is led to the contact zone through a plurality of capillaries which are so small in at the least one dimension that the propagation of an explosive combustion is prevented. The conveyal of the gas mixture to the contact zone is effected for instance through a plate 3 consisting of a bundle of cylindrical capillary tubes or capillaries of about 5 to 10 cm. long, which is placed directly below the contact zone. This arrangement in all cases prevents the striking back of an explosion. In the chamber, directly above the contact zone, the nitric acid 4 serving as cooling liquid is arranged in such a manner, that it can not drop back through the contact gauzes and the capillary tubes when the gas flows through the contact zone. This effect may for instance be obtained by arranging a support for the layer of fluid consisting of a wire gauze, which has meshes of sufficient fineness. This wire gauze may form a contact body itself and may in this case for instance consist of platinum wires. The said wire gauze may however also be formed from wires of an acid-resisting metal, which does not act as a contact, for instance chrome-nickel steel.

After initiating the catalytic combustion in the contact zone with the aid of an oxyhydrogen flame, the nitrogen oxides formed in the reaction pass with partial absorption through the nitric acid 4, which is thereby rapidly heated. With the help of an acid pump 5 the hot acid is passed through a cooler 6 and after cooling is re-pumped into the chamber in such quantities that the level of the liquid in the latter remains constant. The rest is treated on the counter-current principle in a relatively small absorption tower 7 with the gases still containing nitrogen oxides drawn off from the top of the reaction chamber.

With such a process ammonia-oxygen mixtures containing 25% by volume and more of ammonia may be converted into concentrated nitric acid without danger and in especially favourable yield. Particularly favourable results will naturally be obtained when the process is carried out under an excess pressure of several atmospheres, since, as is well known, under these conditions both the combustion and the absorption are favourably influenced.

I claim:

1. A process for the production of concentrated nitric acid by the catalytic combustion of ammonia with gases rich in oxygen, consisting in conducting a gas mixture containing ammonia and oxygen into a contact zone, which in relation to the direction of flow of the gases is situated before and adjacent to a layer of cooling liquid, effecting the combustion in the said contact zone and thereupon leading the gases formed in the reaction through the said layer of cooling liquid directly after their exit from the contact zone.

2. A process for the production of concentrated nitric acid by the catalytic combustion of ammonia with gases rich in oxygen, consisting in conducting a gas mixture containing ammonia and oxygen into a contact zone through a plurality of capillaries arranged before and adjacent to the said contact zone, which in relation to the direction of flow of the gases is situated before and adjacent to a layer of cooling fluid, effecting the combustion in the said contact zone and thereupon leading the gases formed in the reaction through the said layer of cooling fluid directly after their exit from the contact zone.

3. A process for the production of concentrated nitric acid by the catalytic combustion of ammonia with gases rich in oxygen, consisting in conducting a gas mixture containing ammonia and oxygen into a contact zone through a plurality of capillaries arranged before and adjacent to the said contact zone, which in relation to the direction of flow of the gases is situated before and adjacent to a layer of cooling fluid, effecting the combustion in the said contact zone, leading the gases formed in the reaction through the said cooling fluid directly after their exit from the contact zone, cooling the said cooling fluid continually in a circulation process and maintaining the said fluid at a constant level.

4. A process for the production of concentrated nitric acid by the catalytic combustion of ammonia with gases rich in oxygen, consisting in conducting a gas mixture containing ammonia and oxygen into a contact zone through a plurality of capillaries arranged before and adjacent to the said contact zone, which in relation to the direction of flow of the gases is situated before and adjacent to a layer of cooling fluid, effecting the combustion in the said contact zone, leading the gases formed in the reaction through the said cooling fluid directly after their exit from the contact zone, maintaining a raised pressure in the receptacle containing the contact zone and the cooling fluid under this treatment, cooling the said cooling fluid continually in a circulation process and maintaining the said fluid at a constant level.

5. A process for the production of concentrated nitric acid by the catalytic combustion of ammonia with gases rich in oxygen, consisting in conducting a gas mixture containing ammonia and oxygen into a contact zone through a plurality of capillaries arranged before and adjacent to the said contact zone, which in relation to the direction of flow of the gases is situated before and adjacent to a layer of nitric acid, effecting the combustion in the said contact zone, leading the gases formed in the reaction through the said nitric acid directly after their exit from the contact zone, maintaining a raised pressure in the receptacle containing the contact zone and the nitric acid under this treatment, cooling the said nitric acid continually in a circulation process and maintaining the said nitric acid at a constant level.

IVAR WALFRID CEDERBERG.